US012767674B2

(12) United States Patent
Yang et al.

(10) Patent No.: US 12,767,674 B2
(45) Date of Patent: Oct. 20, 2026

(54) METHOD FOR PREPARING 4-(HYDROXYMETHYLPHOSPHINYL)-2-OXOBUTANOIC ACID

(71) Applicants: ZHEJIANG WYNCA CHEMICAL INDUSTRY GROUP CO., LTD, Hangzhou (CN); ZHEJIANG UNIVERSITY, Hangzhou (CN)

(72) Inventors: Lirong Yang, Hangzhou (CN); Shuguang Zhou, Hangzhou (CN); Haisheng Zhou, Hangzhou (CN); Long Qin, Hangzhou (CN); Jianping Wu, Hangzhou (CN); Shenluan Yu, Hangzhou (CN); Linlin Wang, Hangzhou (CN); Bo Zhan, Hangzhou (CN); Ping Wang, Hangzhou (CN)

(73) Assignees: ZHEJIANG WYNCA CHEMICAL INDUSTRY GROUP CO., LTD, Hangzhou (CN); ZHEJIANG UNIVERSITY, Hangzhou (CN)

( * ) Notice: Subject to any disclaimer, the term of this patent is extended or adjusted under 35 U.S.C. 154(b) by 475 days.

(21) Appl. No.: 18/569,247

(22) PCT Filed: Mar. 6, 2023

(86) PCT No.: PCT/CN2023/079749
§ 371 (c)(1),
(2) Date: Dec. 12, 2023

(87) PCT Pub. No.: WO2024/051119
PCT Pub. Date: Mar. 14, 2024

(65) Prior Publication Data

US 2025/0084111 A1 Mar. 13, 2025

(30) Foreign Application Priority Data

Sep. 8, 2022 (CN) ........................ 202211095819.1

(51) Int. Cl.
*C07F 9/30* (2006.01)

(52) U.S. Cl.
CPC .................................... *C07F 9/301* (2013.01)

(58) Field of Classification Search
CPC ............... C07F 9/301; C07F 9/30; C07F 9/32
See application file for complete search history.

(56) References Cited

U.S. PATENT DOCUMENTS 4,399,287 A 8/1983 Baillie et al.

FOREIGN PATENT DOCUMENTS

CN 103539815 A 1/2014
CN 103665032 A 3/2014

(Continued)

OTHER PUBLICATIONS

International Search Report for PCT/CN2023/079749 mailed May 19, 2023, ISA/CN.

(Continued)

*Primary Examiner* — Deborah D Carr

(74) *Attorney, Agent, or Firm* — Yue (Robert) Xu; Apex Attorneys at Law, LLP

(57) ABSTRACT

Provided is a method for preparing 4-(hydroxymethylphosphinyl)-2-oxobutanoic acid, comprising the following steps: a) mixing methylphosphonite diester, carboxylic acid and acryloyl cyanide, performing addition reaction, and performing distillation under reduced pressure to obtain a material solution of (3-cyano-3-carbonylpropyl)methylphosphonate; b) mixing the material solution of (3-cyano-3-carbonylpropyl)methylphosphonate obtained in step a) with water uniformity, cooling to 10° C.-40° C., then adding hydrochloric acid dropwise for acidification, and after the dropwise addition being completed, continuing stirring for 0.1 h-1 h, then performing hydrolysis reaction, and finally performing purification treatment to obtain 4-(hydroxym- (Continued)

ethylphosphinyl)-2-oxobutanoic acid. In the provided preparation method, cyanation reaction is not required, which avoids the use of cyclic phosphonic anhydride that is high in cost and difficult to obtain and the highly toxic sodium cyanide. In addition, the preparation method has short process steps, wide source of raw materials and low cost, mild reaction conditions, and high comprehensive utilization rate of elements.

10 Claims, 1 Drawing Sheet

(56) References Cited

FOREIGN PATENT DOCUMENTS

| | | | | | |
|---|---|---|---|---|---|
| CN | 105218579 | A | | 1/2016 | |
| CN | 106008596 | A | | 10/2016 | |
| CN | 106279270 | A | | 1/2017 | |
| CN | 114085244 | A | * | 2/2022 | ............ C07F 9/3264 |

OTHER PUBLICATIONS

Hans-Joachim Zeiss, Enantioselective Synthesis of Both Enantiomers of Phosphinothricin via Asymmetric Hydrogenation of -Acylamido Acrylates, J. Org. Chem., 1991, 56, 1783-1788.

* cited by examiner

METHOD FOR PREPARING 4-(HYDROXYMETHYLPHOSPHINYL)-2-OXOBUTANOIC ACID

CROSS REFERENCE TO RELATED APPLICATIONS

This application is the national phase of International Application No. PCT/CN2023/079749 titled "METHOD FOR PREPARING 4-(HYDROXYMETHYLPHOSPHINYL)-2-OXOBUTANOIC ACID", filed on Mar. 6, 2023, which claims the priority to Chinese Patent Application No. 202211095819.1, titled "METHOD FOR PREPARING 4-(HYDROXYMETHYLPHOSPHINYL)-2-OXOBUTANOIC ACID", filed on Sep. 8, 2022, with the China National Intellectual Property Administration, which are incorporated herein by reference in entirety.

FIELD

The present invention relates to the technical field of chemical industry, more particularly, to a method for preparing a pesticide intermediate 4-(hydroxymethylphosphinyl)-2-oxobutanoic acid.

BACKGROUND 4-(Hydroxymethylphosphinyl)-2-oxobutanoic acid, abbreviated as PPO or ketoacid, is an important intermediate in the synthesis process of glufosinate-ammonium. This compound can be subjected to steps such as ammoniation reduction to obtain glufosinate-ammonium, which can be bio-enzymatically converted into L-glufosinate-ammonium.

In 1980, FBC Company first applied for the U.S. Pat. No. 4,399,287A for the preparation of ketoacid intermediate, wherein the carbon chain of 3-(ethoxymethylphosphinyl) propanoate is extended through Claisen condensation reaction to obtain a ketoacid intermediate 2-oxo-4-(hydroxymethylacyl) butanoic acid, and it is reported that the isolated yield of the ketoacid intermediate is about 30%. In 1991, Hoechst Company reported a chemical synthesis of 4-(hydroxymethylphosphinyl)-2-oxobutanoic acid (J. Org. Chem. 1991, 56, 1783-1788), wherein monoethyl methylphosphonite and ethyl acrylate are subjected to Michael addition reaction under the action of sodium ethoxide to obtain ethyl 3-(ethoxymethylphosphinyl) propanoate, which is then subjected to Claisen ester condensation reaction with diethyl oxalate under the action of sodium ethoxide at −50° C., and then hydrolysis and decarboxylation are performed with hydrochloric acid to prepare 4-(hydroxymethylphosphinyl)-2-oxobutanoic acid. However, the reaction in this method needs to be performed at −50° C., the overall yield is low, a large amount of waste water is generated, and the duration of the crystallization of the product is as long as 48 hours. The reaction formula is as follows:

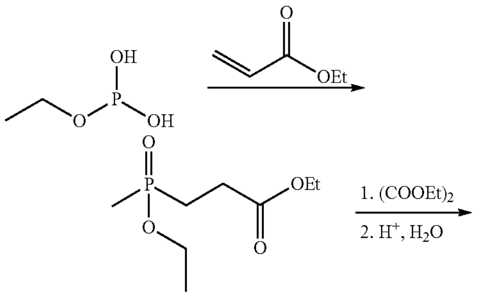

-continued

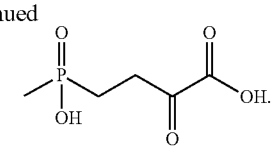

Patent CN103665032A discloses a method for preparing glufosinate-ammonium, using a ketoacid route to prepare an important intermediate of glufosinate-ammonium, 4-(hydroxyl-(methyl)phosphinyl)-2-oxobutanoic acid, comprising using five-membered heterocyclic 2,5-dioxo-1-oxa-2-phosphocyclopentane containing oxygen and phosphorus, and cyanide as raw materials, to perform a cyanidation reaction in an organic solvent to produce ketone cyanide compound, which then undergoes hydrolysis in an acidic solution to obtain ketoacid substance 4-(hydroxy-(methyl) phosphinyl)-2-oxobutanoic acid, and finally the 4-(hydroxy-(methyl)phosphinyl)-2-oxobutanoic acid is subjected to ammoniation and hydrogenation reduction process under the condition of alcohol solvent and catalyst to obtain glufosinate-ammonium. However, the cyclic phosphonic anhydride used in this method is not easily prepared, the cost is high, and the purification is difficult.

Patent CN105218579A discloses a method for synthesizing L-type glufosinate-ammonium salt, wherein the important intermediate 4-(hydroxymethylphosphinyl)-2-oxobutanoic acid is prepared by a method using 4-(ethoxy-(methyl)phosphinyl)-2-acetoxybutyrocyanide as a raw material, comprising firstly hydrolyzing 4-(ethoxy-(methyl) phosphinyl)-2-acetoxybutyrocyanide with hydrochloric acid to obtain 4-(hydroxy-(methyl)phosphinyl)-2-hydroxybutyric acid, then neutralizing the obtained mixture with sodium hydroxide to obtain a salt, followed by oxidizing with sodium hypochlorite aqueous solution into sodium 4-(hydroxyl sodium-(methyl)phosphinyl) 2-oxobutyrate under the catalysis of transition metal oxide, and finally introducing HCl gas for desalination to obtain the 4-(hydroxymethylphosphinyl)-2-oxobutanoic acid. However, this method requires use of a large amount of acid and alkali to produce a large amount of by-product salt, and requires use of noble metals as catalysts, which increases the cost, and the by-product salt is difficult to be processed.

SUMMARY

In view of this, an object of the present invention is to provide a method for preparing 4-(hydroxymethylphosphinyl)-2-oxobutanoic acid. The preparation method has short process steps, wide sources of raw materials and low cost, mild reaction conditions and high comprehensive utilization rate of elements.

The present invention provides a method for preparing 4-(hydroxymethylphosphinyl)-2-oxobutanoic acid, comprising the following steps:

a) mixing methylphosphonite diester, carboxylic acid and acryloyl cyanide, performing addition reaction, and performing distillation under reduced pressure to obtain a material solution of (3-cyano-3-carbonylpropyl)methylphosphonate;

b) mixing the material solution of (3-cyano-3-carbonylpropyl)methylphosphonate obtained in step a) with water uniformity, cooling to 10° C.-40° C., then adding hydrochloric acid dropwise for acidification, and after the dropwise addition being completed, continuing stirring for 0.1 h-1 h, then performing hydrolysis reaction, and finally performing purification treatment to obtain 4-(hydroxymethylphosphinyl)-2-oxobutanoic acid.

Preferably, in step a), the methylphosphonite diester is selected from the group consisting of dimethyl methylphosphonite, diethyl methylphosphonite, dipropyl methylphosphonite, dibutyl methylphosphonite and a combination thereof;

the carboxylic acid is selected from the group consisting of acetic acid, propionic acid, butyric acid, isobutyric acid, valeric acid, isovaleric acid and a combination thereof.

Preferably, in step a), a mass ratio of the methylphosphonite diester and the carboxylic acid is 1:(1-20).

Preferably, in step a), a molar ratio of the acryloyl cyanide to methylphosphonite diester is (0.8-1.5):1.

Preferably, in step a), the mixing process is specifically conducted by:

under the condition of stirring, adding the methylphosphonite diester in carboxylic acid, controlling the temperature at 0° C.-40° C., and dropwise adding acryloyl cyanide for 0.1 h-5 h.

Preferably, in step a), the addition reaction is conducted at a temperature of 0° C.-90° C. for 1 h-10 h.

Preferably, in step b), a molar ratio of the hydrochloric acid to the methylphosphonite diester is (1-5):1.

Preferably, in step b), the acidification is conducted at a temperature of 0° C.-40° C.

Preferably, in step b), the hydrolysis reaction is conducted at a temperature of 60° C.-130° C. for 1 h-24 h.

Preferably, in step b), the purification process is specifically conducted by:

removing acid water from the product obtained by the hydrolysis reaction under reduced pressure, then adding acetone for dissolution, removing insoluble salts by filtration, and adding methyl isobutyl ketone to the filtrate for crystallization to obtain 4-(hydroxymethylphosphinyl)-2-oxobutanoic acid.

The present invention provides a method for preparing 4-(hydroxymethylphosphinyl)-2-oxobutanoic acid, comprising the following steps: a) mixing methylphosphonite diester, carboxylic acid and acryloyl cyanide, performing addition reaction, and performing distillation under reduced pressure to obtain a material solution of (3-cyano-3-carbonylpropyl)methylphosphonate; b) mixing the material solution of (3-cyano-3-carbonylpropyl)methylphosphonate obtained in step a) with water uniformity, cooling to 10° C.-40° C., then adding hydrochloric acid dropwise for acidification, and after the dropwise addition being completed, continuing stirring for 0.1 h-1 h, then performing hydrolysis reaction, and finally performing purification treatment to obtain 4-(hydroxymethylphosphinyl)-2-oxobutanoic acid. Compared with the prior art, in the preparation method provided by the present invention, methylphosphonite diester and acryloyl cyanide, as raw materials, are subjected to addition reaction in a carboxylic acid system to obtain (3-cyano-3-carbonylpropyl)methylphosphonate, which is then hydrolyzed under acidic conditions to obtain the target product 4-(hydroxymethylphosphinyl)-2-oxobutanoic acid. In the preparation method, methylphosphonite diester and acryloyl cyanide are directly subjected to addition reaction, and cyanide reaction is not needed, which avoids the use of cyclic phosphonic anhydride that is high in cost and difficult to obtain and the highly toxic sodium cyanide. Meanwhile, the reaction with acryloyl cyanide directly introduces acyl cyanide group, and then hydrolysis is performed under acidic conditions to obtain the target product, thereby avoiding the use of Claisen ester condensation and decarboxylation to introduce carboxyl, and also avoiding the use of noble metals for catalytic oxidation after salt formation to produce carbonyl. In addition, the preparation method has short process steps, wide source of raw materials and low cost, mild reaction conditions, and high comprehensive utilization rate of elements.

DETAILED DESCRIPTION

Figure 1:
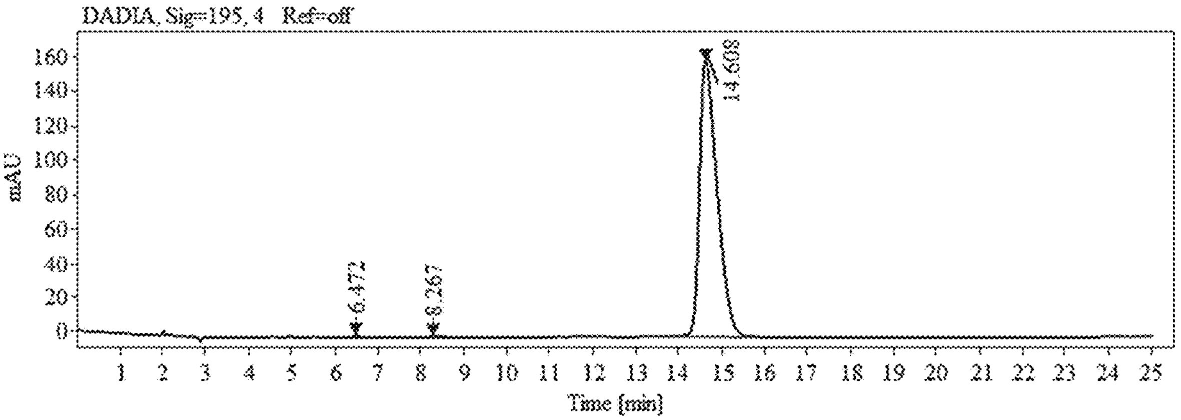
FIG. 1 is the HPLC spectrogram of 4-(hydroxymethylphosphinyl)-2-oxobutanoic acid standard sample.

The technical solutions of the present invention will be clearly and completely described below in conjunction with the examples of the present invention. Apparently, the described examples are only some of the embodiments of the present invention, not all of them. Based on the examples of the present invention, all other examples obtained by those of ordinary skill in the art without making creative efforts belong to the protection scope of the present invention.

The present invention provides a preparation method of 4-(hydroxymethylphosphinyl)-2-oxobutanoic acid, comprising the following steps:

a) mixing methylphosphonite diester, carboxylic acid and acryloyl cyanide, performing addition reaction, and performing distillation under reduced pressure to obtain a material solution of (3-cyano-3-carbonylpropyl)methylphosphonate;

b) mixing the material solution of (3-cyano-3-carbonylpropyl)methylphosphonate obtained in step a) with water uniformity, cooling to 10° C.-40° C., then adding hydrochloric acid dropwise for acidification, and after the dropwise addition being completed, continuing stirring for 0.1 h-1 h, then performing hydrolysis reaction, and finally performing purification treatment to obtain 4-(hydroxymethylphosphinyl)-2-oxobutanoic acid.

The present invention provides a method for preparing 4-(hydroxymethylphosphinyl)-2-oxobutanoic acid. Methylphosphonite diester (represented by formula I below; $R_1$ and $R_2$ can be expressed as C1-C4 alkyl) and acryloyl cyanide (represented by formula II below) as raw materials are reacted in a carboxylic acid (represented by formula III below) system to obtain (3-cyano-3-carbonylpropyl)methylphosphonate (represented by formula IV below), which is then hydrolyzed under acidic conditions to obtain the target product 4-(hydroxymethylphosphinyl)-2-oxobutanoic acid (represented by formula V below);

I

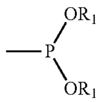

II

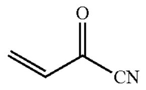

-continued

III $R_2COOH$

IV

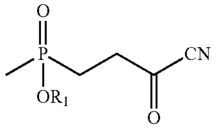

V

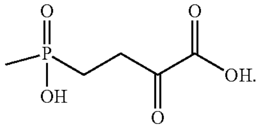

The method for preparing the 4-(hydroxymethylphosphinyl)-2-oxobutanoic acid provided by the present invention is shown in a reaction formula as follows:

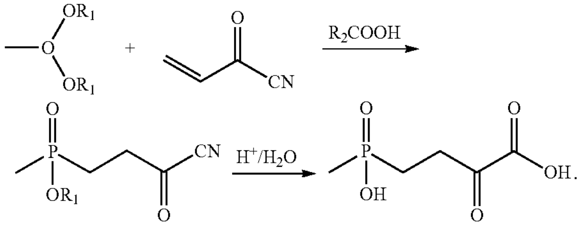

In the preparation method provided by the present invention, methylphosphonite diester and acryloyl cyanide are directly subjected to addition reaction, and cyanide reaction is not needed, which avoids the use of cyclic phosphonic anhydride that is high in cost and difficult to obtain and the highly toxic sodium cyanide. Meanwhile, the reaction with acryloyl cyanide directly introduces acyl cyanide group, and then hydrolysis is performed under acidic conditions to obtain the target product, thereby avoiding the use of Claisen ester condensation and decarboxylation to introduce carboxyl, and also avoiding the use of noble metals for catalytic oxidation after salt formation to produce carbonyl. In addition, the preparation method has short process steps, wide source of raw materials and low cost, mild reaction conditions, and high comprehensive utilization rate of elements.

In the present invention, firstly, methylphosphonite diester, carboxylic acid and acryloyl cyanide are mixed for addition reaction, and distillation under reduced pressure is performed to obtain a material solution of (3-cyano-3-carbonylpropyl)methylphosphonate.

In the present invention, the methylphosphonite diester is preferably selected from the group consisting of dimethyl methylphosphonite, diethyl methylphosphonite, dipropyl methylphosphonite, dibutyl methylphosphonite and a combination thereof, more preferably diethyl methylphosphonite. In the present invention, there is no special limitation on the source of the methylphosphonite diester, and commercially available products well known to those skilled in the art can be used.

In the present invention, the carboxylic acid is preferably selected from the group consisting of acetic acid, propionic acid, butyric acid, isobutyric acid, valeric acid, isovaleric acid, and a combination thereof, more preferably acetic acid. In the present invention, there is no special limitation on the source of the carboxylic acid, and commercially available products well known to those skilled in the art can be used.

In the present invention, the carboxylic acid functions as both a reaction raw material and a solvent.

In the present invention, a mass ratio of the methylphosphonite diester to the carboxylic acid is preferably 1:(1-20).

In the present invention, there is no special limitation on the source of the acryloyl cyanide, and commercially available products well known to those skilled in the art can be used.

In the present invention, a molar ratio of the acryloyl cyanide to methylphosphonite diester is preferably (0.8-1.5):1, more preferably (1-1.1):1.

In the present invention, the mixing process is preferably specifically conducted by:

under the condition of stirring, adding the methylphosphonite diester in carboxylic acid, controlling the temperature at 0° C.-40° C., and dropwise adding acryloyl cyanide for 0.1 h-5 h;

more preferably:

under the condition of stirring, adding the methylphosphonite diester in carboxylic acid, controlling the temperature at 10° C.-30° C., and dropwise adding acryloyl cyanide for 1 h-3 h.

In the present invention, the addition reaction is conducted at a temperature of preferably 0° C.-90° C., more preferably 10° C.-40° C., for 1 h-10 h, more preferably 2 h-4 h.

In the present invention, the purpose of the distillation under reduced pressure is to remove the solvent; and there is no special limitation on this in the present invention.

In the present invention, after the material solution of (3-cyano-3-carbonylpropyl)methylphosphonate is obtained, the obtained material solution of (3-cyano-3-carbonylpropyl)methylphosphonate is mixed with water uniformity. The mixture is cooled down to 10° C.-40° C., and then dropwise added with hydrochloric acid for acidification. After the dropwise addition is completed, stirring is continued for 0.1 h-1 h. Then the resulting mixture is subjected to hydrolysis reaction, and finally purification treatment to obtain 4-(hydroxymethylphosphinyl)-2-oxobutanoic acid.

In the present invention, the hydrochloric acid has a concentration of preferably 20%-36%; and commercially available products well known to those skilled in the art can be used.

In the present invention, a molar ratio of the hydrochloric acid (HCl) to methylphosphonite diester is preferably (1-5):1, more preferably (2-3):1.

In the present invention, the acidification is performed at a temperature of preferably 0° C.-40° C., more preferably 30° C.-40° C.

In the present invention, the hydrolysis reaction is performed at a temperature of preferably 60° C.-130° C., more preferably 90° C.-120° C., for preferably 1 h-24 h, more preferably 6 h-12 h.

In the present invention, the process of the hydrolysis reaction is preferably specifically conducted by:

first, heating at normal pressure for about 1.5 h-2.5 h to 105° C.-113° C., then maintaining the temperature for reflux for 2.5 h-3.5 h, and then slowly heating for 2.5 h-3.5 h to 114° C.-116° C.;

or, slowly heating for 7 h-9 h to reach 115° C.-125° C.

In the present invention, the process of the purification treatment is preferably specifically conducted by:

removing acid water from the product obtained by the hydrolysis reaction under reduced pressure, then adding acetone for dissolution, removing insoluble salts by filtration, and adding methyl isobutyl ketone to the filtrate for crystallization to obtain 4-(hydroxymethylphosphinyl)-2-oxobutanoic acid.

The present invention provides a method for preparing 4-(hydroxymethylphosphinyl)-2-oxobutanoic acid, comprising the following steps: a) mixing methylphosphonite diester, carboxylic acid and acryloyl cyanide, performing addition reaction, and performing distillation under reduced pressure to obtain a material solution of (3-cyano-3-carbonylpropyl)methylphosphonate; b) mixing the material solution of (3-cyano-3-carbonylpropyl)methylphosphonate obtained in step a) with water uniformity, cooling to 10° C.-40° C., then adding hydrochloric acid dropwise for acidification, and after the dropwise addition being completed, continuing stirring for 0.1 h-1 h, then performing hydrolysis reaction, and finally performing purification treatment to obtain the 4-(hydroxymethylphosphinyl)-2-oxobutanoic acid. Compared with the prior art, in the preparation method provided by the present invention, methylphosphonite diester and acryloyl cyanide as raw materials are subjected to addition reaction in a carboxylic acid system to obtain (3-cyano-3-carbonylpropyl)methylphosphonate, which is then hydrolyzed under acidic conditions to obtain the target product 4-(hydroxymethylphosphinyl)-2-oxobutanoic acid. In the preparation method, methylphosphonite diester and acryloyl cyanide are directly subjected to addition reaction, and cyanide reaction is not needed, which avoids the use of cyclic phosphonic anhydride that is high in cost and difficult to obtain and the highly toxic sodium cyanide. Meanwhile, the reaction with acryloyl cyanide directly introduces acyl cyanide group, and then hydrolysis is performed under acidic conditions to obtain the target product, thereby avoiding the use of Claisen ester condensation and decarboxylation to introduce carboxyl, and also avoiding the use of noble metals for catalytic oxidation after salt formation to produce carbonyl. In addition, the preparation method has short process steps, wide source of raw materials and low cost, mild reaction conditions, and high comprehensive utilization rate of elements.

In order to further illustrate the present invention, the present invention is described in detail below in conjunction with the following examples. The raw materials used in the following examples of the present invention are all commercially available products.

Example 1

1) 69.4 g (0.5 mol) of 98% diethyl methylphosphonite was added to 250 g of acetic acid. The mixture was stirred, mixed uniformity, cooled to 10° C., and slowly dropwise added with 41.3 g (0.5 mol) of 98% acryloyl cyanide for reaction. The temperature was controlled at 10° C. The dropwise addition was completed after 2 h. Then the temperature was continued to be kept at 10° C. for 3 h of reaction to obtain a solution containing (3-cyano-3-carbonylpropyl)methylphosphonate. The solution was subjected to distillation under reduced pressure to remove solvent acetic acid and by-product ethyl acetate to obtain a material solution of (3-cyano-3-carbonylpropyl)methylphosphonate.
2) 50 g of deionized water was added to the above-mentioned obtained material solution of (3-cyano-3-carbonylpropyl)methylphosphonate. The mixture was stirred, mixed uniformity, cooled to below 40° C., and then dropwise added with 121.7 g (1.0 mol) of 30% hydrochloric acid for acidification. The acidification was conducted at a temperature controlled at below 40° C. After the dropwise addition was completed, the mixture was stirred and mixed for 0.5 h, and then heated for hydrolysis reaction. First, the mixture was heated under normal pressure for about 2 hours to 110° C., then kept at 110° C. for 3 hours of reflux, and then slowly heated for 3 hours to 115° C. Finally, the resulting mixture was deacidified under reduced pressure in a vacuum condition at −0.095 Mpa for 1 hour, and the final temperature was 65° C. 150 g of acetone was added for reflux and dissolution. Filtration was performed to remove insoluble salt. 400 g of methyl isobutyl ketone was added to the filtrate for crystallization to obtain 48.6 g of white solid product 4-(hydroxymethylphosphinyl)-2-oxobutanoic acid, with a content of 95.3% and a yield of 51.5%.

Example 2

1) 69.4 g (0.5 mol) of 98% diethyl methylphosphonite was added to 250 g of acetic acid. The mixture was stirred, mixed uniformity, controlled at 30° C., and slowly dropwise added with 41.3 g (0.5 mol) of 98% acryloyl cyanide for reaction. The temperature was controlled at 30° C. The dropwise addition was completed after 1 h. Then the temperature was continued to be kept at 30° C. for 2 h of reaction to obtain a solution containing (3-cyano-3-carbonylpropyl)methylphosphonate. The solution was subjected to distillation under reduced pressure to remove solvent acetic acid and by-product ethyl acetate to obtain a material solution of (3-cyano-3-carbonylpropyl)methylphosphonate.
2) 50 g of deionized water was added to the above-mentioned obtained material solution of (3-cyano-3-carbonylpropyl)methylphosphonate. The mixture was stirred, mixed uniformity, cooled to below 40° C., and then dropwise added with 182.5 g (1.5 mol) of 30% hydrochloric acid for acidification. The acidification was conducted at a temperature controlled at below 40° C. After the dropwise addition was completed, the mixture was stirred and mixed for 0.5 h, and then heated for hydrolysis reaction. First, the mixture was heated under normal pressure for about 2 hours to 110° C., then kept at 110° C. for 3 hours of reflux, and then slowly heated for 3 hours to 115° C. Finally, the resulting mixture was deacidified under reduced pressure in a vacuum condition at −0.095 Mpa for 1 hour, and the final temperature was 65° C. 150 g of acetone was added for reflux and dissolution. Filtration was performed to remove insoluble salt. 400 g of methyl isobutyl ketone was added to the filtrate for crystallization to obtain 44.7 g of white solid product 4-(hydroxymethylphosphinyl)-2-oxobutanoic acid, with a content of 93.6% and a yield of 46.5%.

Example 3

1) 69.4 g (0.5 mol) of 98% diethyl methylphosphonite was added to 250 g of acetic acid. The mixture was stirred, mixed uniformity, controlled at 30° C., and slowly dropwise added with 41.3 g (0.5 mol) of 98% acryloyl cyanide for reaction. The temperature was controlled at 30° C. The dropwise addition was completed after 1 h. Then the temperature was continued to be kept at 30° C. for 2 h of reaction to obtain a solution containing (3-cyano-3-carbonylpropyl)methylphosphonate. The solution was subjected to distillation under reduced pressure to remove solvent acetic acid and by-product ethyl acetate to obtain a material solution of (3-cyano-3-carbonylpropyl)methylphosphonate.

2) 50 g of deionized water was added to the above-mentioned obtained material solution of (3-cyano-3-carbonylpropyl)methylphosphonate. The mixture was stirred, mixed uniformity, cooled to below 40° C., and then dropwise added with 182.5 g (1.5 mol) of 30% hydrochloric acid for acidification. The acidification was conducted at a temperature controlled at below 40° C. After the dropwise addition was completed, the mixture was stirred and mixed for 0.5 h, and then slowly heated under normal pressure for hydrolysis reaction. The mixture was slowly heated for 8 h to 120° C., and then the steaming was stopped. The resulting mixture was deacidified under reduced pressure in a vacuum condition at −0.03 Mpa until the temperature dropped to about 100° C., and then the vacuum was removed. 150 g of acetone was added for reflux and dissolution. Filtration was performed to remove insoluble salt. 400 g of methyl isobutyl ketone was added to the filtrate for crystallization to obtain 44.2 g of white solid product 4-(hydroxymethylphosphinyl)-2-oxobutanoic acid, with a content of 92.6% and a yield of 45.5%.

Example 4

1) 69.4 g (0.5 mol) of 98% diethyl methylphosphonite was added to 300 g of acetic acid. The mixture was stirred, mixed uniformity, cooled to 10° C., and slowly dropwise added with 45.5 g (0.55 mol) of 98% acryloyl cyanide for reaction. The temperature was controlled at 10° C. The dropwise addition was completed after 2 h. Then the temperature was continued to be kept at 10° C. for 3 h of reaction to obtain a solution containing (3-cyano-3-carbonylpropyl)methylphosphonate. The solution was subjected to distillation under reduced pressure to remove solvent acetic acid and by-product ethyl acetate to obtain a material solution of (3-cyano-3-carbonylpropyl)methylphosphonate.

Figure 2:
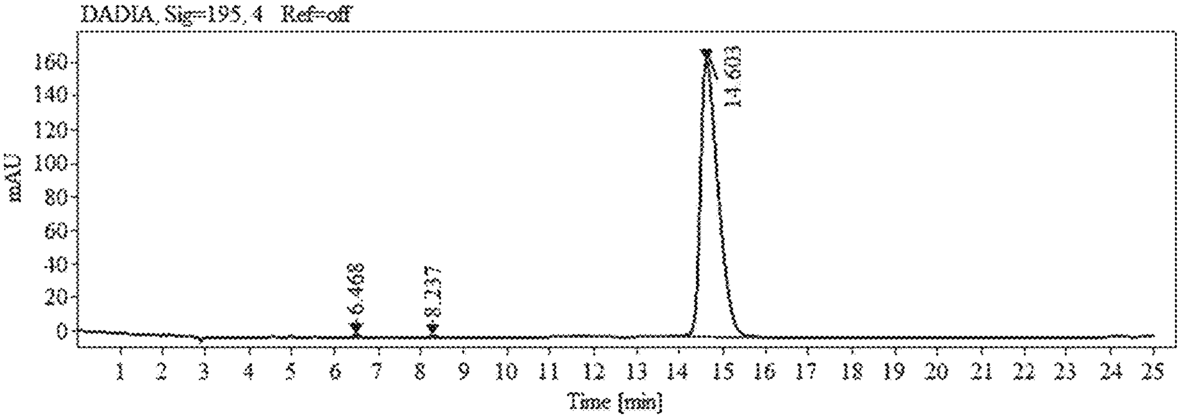
FIG. 2 is the HPLC spectrogram of the 4-(hydroxymethylphosphinyl)-2-oxobutanoic acid sample obtained in Example 4 of the present invention.

2) 50 g of deionized water was added to the above-mentioned obtained material solution of (3-cyano-3-carbonylpropyl)methylphosphonate. The mixture was stirred, mixed uniformity, cooled to below 40° C., and then dropwise added with 182.5 g (1.5 mol) of 30% hydrochloric acid for acidification. The acidification was conducted at a temperature controlled at below 40° C. After the dropwise addition was completed, the mixture was stirred and mixed for 0.5 h, and then heated for hydrolysis reaction. First, the mixture was heated under normal pressure for about 2 hours to 110° C., then kept at 110° C. for 3 hours of reflux, and then slowly heated for 3 hours to 115° C. Finally, the resulting mixture was deacidified under reduced pressure in a vacuum condition at −0.095 Mpa for 1 hour, and the final temperature was 65° C. 150 g of acetone was added for reflux and dissolution. Filtration was performed to remove insoluble salt. 400 g of methyl isobutyl ketone was added to the filtrate for crystallization to obtain 50.5 g of white solid product 4-(hydroxymethylphosphinyl)-2-oxobutanoic acid, with a content of 98.5% and a yield of 55.3%, which was quantified by HPLC with a standard sample as the external standard (standard sample: FIG. 1, sample: FIG. 2).

Example 5

1) 69.4 g (0.5 mol) of 98% diethyl methylphosphonite was added to 300 g of acetic acid. The mixture was stirred, mixed uniformity, controlled at 30° C., and slowly dropwise added with 45.5 g (0.55 mol) of 98% acryloyl cyanide for reaction. The temperature was controlled at 30° C. The dropwise addition was completed after 1 h. Then the temperature was continued to be kept at 30° C. for 2 h of reaction to obtain a solution containing (3-cyano-3-carbonylpropyl)methylphosphonate. The solution was subjected to distillation under reduced pressure to remove solvent acetic acid and by-product ethyl acetate to obtain a material solution of (3-cyano-3-carbonylpropyl)methylphosphonate.

2) 50 g of deionized water was added to the above-mentioned obtained material solution of (3-cyano-3-carbonylpropyl)methylphosphonate. The mixture was stirred, mixed uniformity, cooled to below 40° C., and then dropwise added with 121.7 g (1.0 mol) of 30% hydrochloric acid for acidification. The acidification was conducted at a temperature controlled at below 40° C. After the dropwise addition was completed, the mixture was stirred and mixed for 0.5 h, and then slowly heated under normal pressure for hydrolysis reaction. The mixture was slowly heated for 8 h to 120° C., and then the steaming was stopped. The resulting mixture was deacidified under reduced pressure in a vacuum condition at −0.03 Mpa until the temperature dropped to about 100° C., and then the vacuum was removed. 150 g of acetone was added for reflux and dissolution. Filtration was performed to remove insoluble salt. 400 g of methyl isobutyl ketone was added to the filtrate for crystallization to obtain 46.5 g of white solid product 4-(hydroxymethylphosphinyl)-2-oxobutanoic acid, with a content of 95.1% and a yield of 49.1%.

Example 6

1) 69.4 g (0.5 mol) of 98% diethyl methylphosphonite was added to 300 g of acetic acid. The mixture was stirred, mixed uniformity, cooled to 10° C., and slowly dropwise added with 45.5 g (0.55 mol) of 98% acryloyl cyanide for reaction. The temperature was controlled at 10° C. The dropwise addition was completed after 2 h. Then the temperature was continued to be kept at 10° C. for 3 h of reaction to obtain a solution containing (3-cyano-3-carbonylpropyl)methylphosphonate. The solution was subjected to distillation under reduced pressure to remove solvent acetic acid and by-product ethyl acetate to obtain a material solution of (3-cyano-3-carbonylpropyl)methylphosphonate.

2) 50 g of deionized water was added to the above-mentioned obtained material solution of (3-cyano-3-carbonylpropyl)methylphosphonate. The mixture was stirred, mixed uniformity, cooled to below 40° C., and then dropwise added with 121.7 g (1.0 mol) of 30% hydrochloric acid for acidification. The acidification was conducted at a temperature controlled at below 40° C. After the dropwise addition was completed, the mixture was stirred and mixed for 0.5 h, and then slowly heated under normal pressure for hydrolysis reaction. The mixture was slowly heated for 8 h to 120° C., and then the steaming was stopped. The resulting mixture was deacidified under reduced pressure in a vacuum condition at −0.03 Mpa until the temperature dropped to about 100° C., and then the vacuum was removed. 150 g of acetone was added for reflux and dissolution. Filtration was performed to remove insoluble salt. 400 g of methyl isobutyl ketone was added to the filtrate for crystallization to obtain 49.0 g of white solid product 4-(hydroxymethylphosphinyl)-2-oxobutanoic acid, with a content of 97.8% and a yield of 53.2%.

The above are only preferred embodiments of the present invention. It should be noted that for those of ordinary skill in the art, several improvements and modifications can also be made without departing from the principle of the present invention, and these improvements and modifications should also be considered as the protection scope of the present invention.

The invention claimed is:

1. A method for preparing 4-(hydroxymethylphosphinyl)-2-oxobutanoic acid, comprising the following steps:

a) mixing methylphosphonite diester, carboxylic acid and acryloyl cyanide, performing addition reaction, and performing distillation under reduced pressure to obtain a material solution of (3-cyano-3-carbonylpropyl)methylphosphonate; and b) mixing the material solution of (3-cyano-3-carbonylpropyl)methylphosphonate obtained in step a) with water uniformity, cooling to 10° C.-40° C., then adding hydrochloric acid dropwise for acidification, and after the dropwise addition being completed, continuing stirring for 0.1 h-1 h, then performing hydrolysis reaction, and finally performing purification treatment to obtain the 4-(hydroxymethylphosphinyl)-2-oxobutanoic acid.

2. The method according to claim 1, wherein in step a), the methylphosphonite diester is selected from the group consisting of dimethyl methylphosphonite, diethyl methylphosphonite, dipropyl methylphosphonite, dibutyl methylphosphonite and a combination thereof; and the carboxylic acid is selected from the group consisting of acetic acid, propionic acid, butyric acid, isobutyric acid, valeric acid, isovaleric acid and a combination thereof.

3. The method according to claim 1, wherein in step a), a mass ratio of the methylphosphonite diester and carboxylic acid is 1:(1-20).

4. The method according to claim 1, wherein in step a), a molar ratio of the acryloyl cyanide to methylphosphonite diester is (0.8-1.5): 1.

5. The method according to claim 1, wherein in step a), the mixing process is specifically conducted by:

under the condition of stirring, adding the methylphosphonite diester in the carboxylic acid, controlling the temperature at 0° C.-40° C., and dropwise adding acryloyl cyanide for 0.1 h-5 h.

6. The method according to claim 1, wherein in step a), the addition reaction is conducted at a temperature of 0° C.-90° C. for 1 h-10 h.

7. The method according to claim 1, wherein in step b), a molar ratio of the hydrochloric acid to methylphosphonite diester is (1-5): 1.

8. The method according to claim 1, wherein in step b), the acidification is conducted at a temperature of 0° C.-40° C.

9. The method according to claim 1, wherein in step b), the hydrolysis reaction is conducted at a temperature of 60° C.-130° C. for 1 h-24 h.

10. The method according to claim 1, wherein in step b), the purification process is specifically conducted by:

removing acid water from the product obtained by the hydrolysis reaction under reduced pressure, then adding acetone for dissolution, removing insoluble salts by filtration, and adding methyl isobutyl ketone to the filtrate for crystallization to obtain the 4-(hydroxymethylphosphinyl)-2-oxobutanoic acid.

* * * * *